July 6, 1937. J. W. TALBOT 2,086,005
ADJUSTABLE LAWN MOWER SHARPENER
Filed Feb. 25, 1935
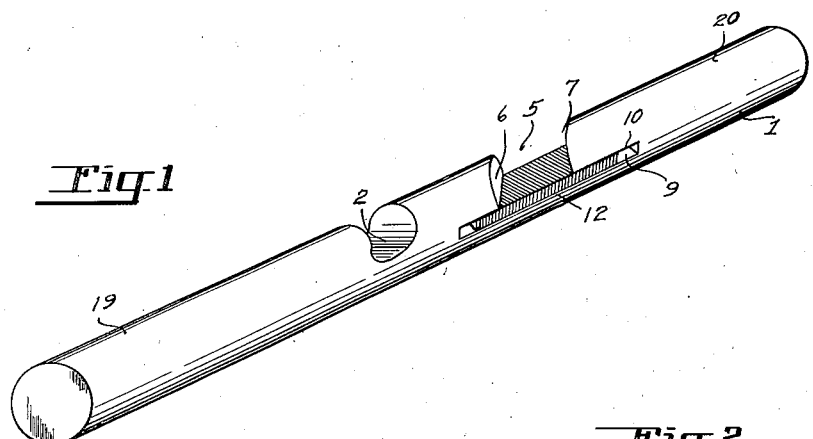
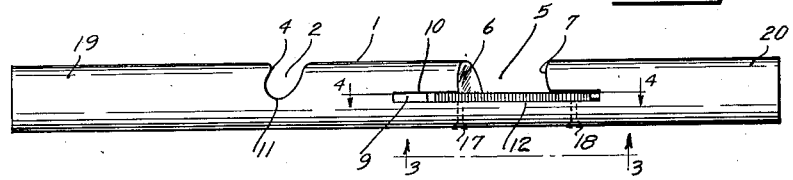
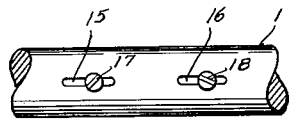
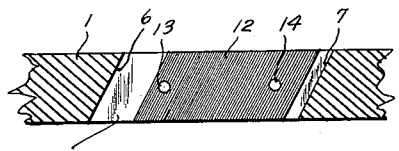
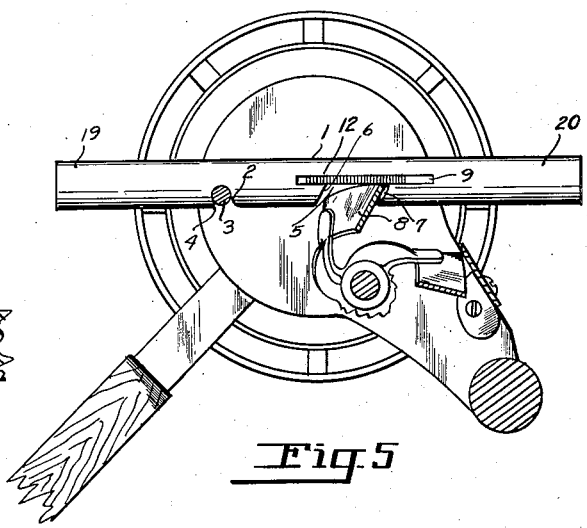
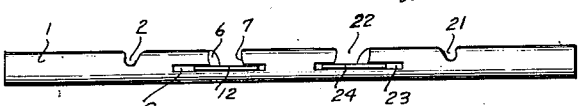
JESSE W. TALBOT
INVENTOR
ATTORNEY Patented July 6, 1937

2,086,005

UNITED STATES PATENT OFFICE 2,086,005

ADJUSTABLE LAWN MOWER SHARPENER

Jesse W. Talbot, Portland, Oreg.

Application February 25, 1935, Serial No. 8,087

1 Claim. (Cl. 76—82.1)

The invention is comprised primarily of a holder member. The holder member has a locking notch disposed midway its ends and is adapted to be engaged upon the cross bar of the lawn mower. A second notch is disposed in spaced relation with the locking notch and I place a sharpening element, as a file section adjustably in the base of the second notch. This second notch is intended for engaging the blade of the lawn mower and as the sharpening device is moved longitudinally of the cross bar of the lawn mower the sharpening element is forcibly made to engage the blade of the mower and as the same is moved therealong the lawn mower head is partially rotated. The file section is adjustably moved within a slit disposed within a holder to facilitate its being moved longitudinally of the slit to thereby provide at intervals a new cutting section of the file to facilitate faster sharpening of the blade.

While I have here shown one locking notch and one sharpening element disposed in spaced relation therewith I do not wish to be limited to one as an additional one may be placed at the opposite sides of the locking notch to thereby provide a course and fine sharpening element for the sharpening process.

The primary purpose and object of my invention consists in providing a simple lawn mower sharpener that may be used by anyone and that may be made to give a sharp cutting edge to the blade with a minimum of effort.

A still further object of my invention consists in placing in the hands of the ordinary lawn mower user a simple tool that may be used by any man or woman for the sharpening of the lawn mower blade to thereby lessen the time for cutting the lawn and at the same time produce a satisfactory cutting edge upon the cutting blade or blades of the lawn mower.

A still further object of my invention consists in providing a sharpener for lawn mowers that may be cheaply built and one that will have a long and useful life and one that may be used over long periods of time with practical freedom from operating annoyances.

With these and incidental objects in view, the invention consists in certain novel features of construction and combination of parts, the essential elements of which are set forth in the appended claim, and a preferred form of embodiment of which is hereinafter shown with reference to the drawing which accompanies and forms a part of this specification.

In the drawing:

Fig. 1 is a perspective end view of the lawn mower sharpener having but a single sharpening element disposed therein.

Fig. 2 is a side view of the device illustrated in Fig. 1.

Fig. 3 is a fragmentary inverted plan view of a portion of the device illustrated in Fig. 2. This view is taken on line 3—3 of Fig. 2, looking in the direction indicated.

Fig. 4 is a fragmentary sectional plan view of the mechanism illustrated in Fig. 2. This view is taken on line 4—4 of Fig. 2, looking in the direction indicated.

Fig. 5 is a sectional side view of a lawn mower and illustrating one of my new and improved sharpening devices in place upon the lawn mower.

Fig. 6 is a side view of a modified form of sharpening device.

Like reference characters refer to like parts throughout the several views.

I preferably make the body of the holder of my device of a single piece of cylindrical material. The holder is illustrated at 1. A locking notch 2 is disposed within the body of the holder and between its ends. This locking notch 2 is intended to engage the cross bar 3 of the lawn mower and to be moved therealong. The lip 4 of the locking notch extends over a part of the circumference of the cross bar 3 and locks the holder upon the cross bar 3. A second notch 5 is cut in the same side of the holder as that of the locking notch 4. The shoulders 6 and 7 of the notch 5 are spaced apart sufficiently to permit the blade 8 passing therebetween. A slit 9 is disposed longitudinally of the holder. The top edge 10 of the slit 9 is preferably placed substantially in alignment with the bottom 11 of the notch 2. A sharpening element 12 is adjustably placed within the slit 9. The length of the abrasive and sharpening element 12 is preferably made shorter than the length of the slit 9 in order that the abrasive or sharpening element 12 may be adjusted within the slit. Spaced holes 13 and 14 are disposed within the sharpening element and slits 15 and 16 are disposed within the holder so that fastening elements as screws 17 and 18 may be placed within the slits and made to engage within the holes 13 and 14 of the sharpening element. This permits of a longitudinal adjusting element within the slit 9 and permits this section of the sharpening element to be made to engage upon the blade 8 to be sharpened.

In the use of my device the notch 2 is made to engage the cross bar 3 adjacent one of the supporting and driving wheels of the lawn mower and the notch 5 is positioned so that the shoulder 7 of the holder is made to engage the blade to be sharpened and the cutting edge of the blade is made to engage directly upon the sharpening element 12. Pressure is then applied by the hands of the user upon the ends 19 and 20 and the holder is then moved longitudinally of the cross bar 3. The outer edge of the sharpening blade then engages the shoulder 7 and as the device is moved the cutter head of the lawn mower will be partially rotated.

In the modified construction illustrated in Fig. 6 a locking notch 21, a sloping shouldered notch 22 and a slit 23 are disposed in the body member 1. In the slit 23 there is disposed another sharpening element as a hone 24 to produce a finer edge on the cutting blade. It will be seen that after the blade has been sharpened with the sharpening element 7 the body member 1 may be reversed so that the notch 21 engages the cross bar 3 of the lawn mower. The finishing operation is then accomplished in the same manner as described for the sharpening operation.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claim which follows.

What I claim is:

A sharpener comprising a one piece handle element, a slit disposed through the handle element extending centrally and laterally thereof, a cut out portion disposed laterally of the handle and having angularly disposed side walls extending to the slit, a sharpening element adjustably secured within the slit, one of said angularly disposed side walls being adapted to engage the face of the cutting blade of a mower to cause the same to be rotated as the sharpening element is moved across the blade, a notch disposed in the handle element for engaging the cross bar of a lawn mower, said notch being disposed at an angle other than a right angle to the longitudinal center line of the same to prevent premature removal from the cross bar.

JESSE W. TALBOT.